United States Patent
Kuang et al.

(10) Patent No.: US 8,959,388 B1
(45) Date of Patent: Feb. 17, 2015

(54) MANAGING TLU RECOVERY USING PRE-ALLOCATED LUN SLICES

(71) Applicant: EMC Corporation, Hopkinton, MA (US)

(72) Inventors: Yaming Kuang, Shanghai (CN); Dennis Duprey, Raleigh, NC (US); Samuel Mullis, Raleigh, NC (US); Changxin Liu, Shanghai (CN)

(73) Assignee: EMC Corporation, Hopkinton, MA (US)

( * ) Notice: Subject to any disclaimer, the term of this patent is extended or adjusted under 35 U.S.C. 154(b) by 187 days.

(21) Appl. No.: 13/729,545

(22) Filed: Dec. 28, 2012

(51) Int. Cl.
 *G06F 11/00* (2006.01)
 *G06F 11/14* (2006.01)

(52) U.S. Cl.
 CPC ................ *G06F 11/1469* (2013.01)
 USPC .......................... 714/6.2; 714/6.12

(58) Field of Classification Search
 CPC .................................... G06F 11/1469
 USPC .......... 714/6.2, 6.12, 6.32, 6.21, 6.22, 15, 16, 714/20
 See application file for complete search history.

(56) References Cited

U.S. PATENT DOCUMENTS

| | | | |
|---|---|---|---|
| 6,526,478 B1* | 2/2003 | Kirby | 711/114 |
| 6,606,690 B2* | 8/2003 | Padovano | 711/148 |
| 8,255,803 B1 | 8/2012 | McAdam et al. | |
| 8,479,046 B1 | 7/2013 | Bailey et al. | |
| 2005/0172097 A1* | 8/2005 | Voigt et al. | 711/170 |
| 2012/0005423 A1 | 1/2012 | Zhuang et al. | |
| 2012/0254462 A1* | 10/2012 | Sengupta et al. | 709/238 |
| 2012/0260127 A1* | 10/2012 | Jibbe et al. | 714/6.21 |
| 2014/0059300 A1* | 2/2014 | Olin et al. | 711/142 |

* cited by examiner

*Primary Examiner* — Dieu-Minh Le
(74) *Attorney, Agent, or Firm* — BainwoodHuang (57) ABSTRACT

A technique of managing thin pool logical unit (TLU) recovery is performed in a data storage array that forms TLUs from a slice storage pool of logical unit (LUN) slices. The technique involves allocating a set of LUN slices of the slice storage pool to support TLU recovery. The technique further involves, after the set of LUN slices has been allocated, taking offline a TLU which currently requires TLU recovery. The technique further involves, while the TLU is offline, performing a TLU recovery procedure to recover the TLU. The TLU recovery procedure utilizes the set of LUN slices that was allocated to support TLU recovery.

20 Claims, 6 Drawing Sheets

ALLOCATE A SET OF LUN SLICES OF A SLICE STORAGE POOL TO SUPPORT TLU RECOVERY (E.G., PROVIDE PARTICULAR LUN SLICES OF THE SLICE STORAGE POOL TO A TLU RECOVERY UTILITY IN A MANNER THAT PREVENTS RE-ALLOCATION OF THE SAME LUN SLICES TO TLUS FOR STORAGE OF NEW HOST DATA) \ 102

TAKE AN UNHEALTHY TLU OFFLINE (E.G., IN RESPONSE TO DETECTION OF CORRUPTED METADATA, PREVENT HOST DEVICES FROM ACCESSING THE UNHEALTHY TLU) \ 104

WHILE THE TLU IS OFFLINE, PERFORM TLU RECOVERY UTILIZING THE SET OF LUN SLICES THAT WAS ALLOCATED TO SUPPORT TLU RECOVERY (E.G., USE ONE LUN SLICE FOR THE CORE RECOVERY UTILITY, USE TWO LUN SLICES FOR RECOVERY OF A FIRST TLU, MAINTAIN TWO ADDITIONAL LUN SLICES FOR POSSIBLE CONCURRENT RECOVERY OF ANOTHER TLU, ETC.) \ 106

MANAGING TLU RECOVERY USING PRE-ALLOCATED LUN SLICES

BACKGROUND

In general, data storage systems maintain host data on behalf of host devices. Such host data is typically stored within logical units (LUNs) on physical storage devices such as solid state drives and magnetic disk drives. A pool is a collection of physical storage devices grouped together. A particular type of data storage system manages host data within thin pool LUNs (TLUs). A TLU is a type of LUN which grows in size dynamically based on the amount of host data it must hold. That is, when new host data is written to a TLU, LUN slices from a pool of LUN slices are added to the TLU on demand.

One conventional data storage system is equipped with a recovery program which enables the conventional data storage system to recover data from an unhealthy TLU. Along these lines, suppose that an unhealthy TLU is detected in the conventional data storage system. Each TLU resides in a container file system hence referred to as "file system" in this context. For example, during operation, suppose that the data storage system identifies corrupted file system metadata. In this situation, the unhealthy TLU, or multiple TLUs if more than one resides in the file system, is taken offline and the recovery program is started. For the recovery program to run properly, the recovery program borrows LUN slices from the pool of LUN slices, and then uses the borrowed LUN slices as scratch space to recover the file system metadata (e.g., the recovery program may apply error checking and error correction algorithms to remaining uncorrupted portions of file system metadata to recreate the metadata). Once the data is properly recovered by the recovery program, the recovery program terminates and the borrowed LUN slices are released back to the pool.

SUMMARY

It should be understood that there are deficiencies to the above-described conventional data storage system which has a recovery program that borrows LUN slices from a pool of LUN slices and uses the borrowed LUN slices as scratch space to recover data of an unhealthy TLU. For example, it is possible for the conventional data storage system to allocate all of the LUN slices of the pool to TLUs. In such a situation, suppose that the data storage system then discovers an unhealthy TLU requiring recovery. Unfortunately, since there are no available LUN slices left in the pool for the recovery program to borrow, the recovery program is unable to run, and data recovery fails. That is, the lack of available LUN slices prevents (i.e., starves out) the recovery program from operating, and the situation becomes an unfortunate DU/DL (data unavailable/data lost) case.

Additionally, even if the recovery program is able to successfully borrow LUN slices from the pool in order to start recovery of a first TLU, such borrowing of LUN slices may prevent the recovery program from further operating to concurrently recover a second TLU. That is, while the recovery program is in operation recovering the first TLU, there may not be any additional LUN slices in the pool that can be borrowed in order to start recovery of the second TLU. Accordingly, recovery of the second TLU fails, and the second TLU becomes an unfortunate DU/DL case.

In contrast to the above-described conventional data storage system which has a recovery program that borrows LUN slices from a pool of LUN slices to recover a TLU, improved techniques involve pre-allocating LUN slices to support TLU recovery. With such pre-allocation, TLU recovery has an adequate amount of memory to use as work space when recovering TLU data. Additionally, with the LUN slices pre-allocated to support TLU recovery, these LUN slices may be shared (e.g., used to recover a first TLU, then used to recover a second TLU, and so on). Furthermore, in some arrangements, enough LUN slices are pre-allocated to support recovery of multiple TLUs concurrently. With LUN slices pre-allocated to TLU recovery, TLU recovery is guaranteed to have enough work space to properly recover data.

One embodiment is directed to a method of managing TLU recovery which is performed in a data storage array that forms TLUs from a slice storage pool of LUN slices. The method includes allocating a set of LUN slices of the slice storage pool to support TLU recovery. The method further includes, after the set of LUN slices has been allocated, taking offline a TLU which currently requires TLU recovery. The method further includes, while the TLU is offline, performing a TLU recovery procedure to recover the TLU. The TLU recovery procedure utilizes the set of LUN slices that was pre-allocated to support TLU recovery.

In some arrangements, pre-allocating the set of LUN slices of the slice storage pool to support TLU recovery includes dedicating the set of LUN slices exclusively to TLU recovery to prevent allocation of any of the set of LUN slices to form TLU storage. That is, a predefined number of LUN slices are proactively set aside (i.e., reserved so that there are always enough LUN slices available for the express purpose of being used by the TLU recovery procedure).

In some arrangements, specific LUN slices of the slice storage pool are identified for TLU recovery. In these arrangements, the specific LUN slices are never used by a TLU or for any purpose other than TLU recovery. Accordingly, if the metadata involved in LUN slice allocation becomes corrupted, there is no likelihood that the TLU recovery procedure would inadvertently use LUN slices holding important data as workspace. Rather, the TLU recovery procedure is able to safely run using LUN slices which were not used for any purpose other than TLU recovery.

Other embodiments are directed to electronic systems and apparatus, data storage systems and assemblies, processing circuits, computer program products, and so on. Some embodiments are directed to various processes, electronic components and circuitry which are involved in managing TLU recovery.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique involves pre-allocating LUN slices to support TLU recovery. With such pre-allocation, TLU recovery has an adequate amount of storage to use as work space when recovering TLU data. Additionally, with the LUN slices pre-allocated to support TLU recovery, these LUN slices may be shared (e.g., used to recover a first TLU, then used to recover a second TLU, etc.). Furthermore, in some arrangements, enough LUN slices are pre-allocated to support recovery of multiple TLUs concurrently (e.g., simultaneous recovery of two TLUs). With LUN slices pre-allocated to TLU recovery, TLU recovery is guaranteed to have enough work space to properly recover data.

Figure 1:
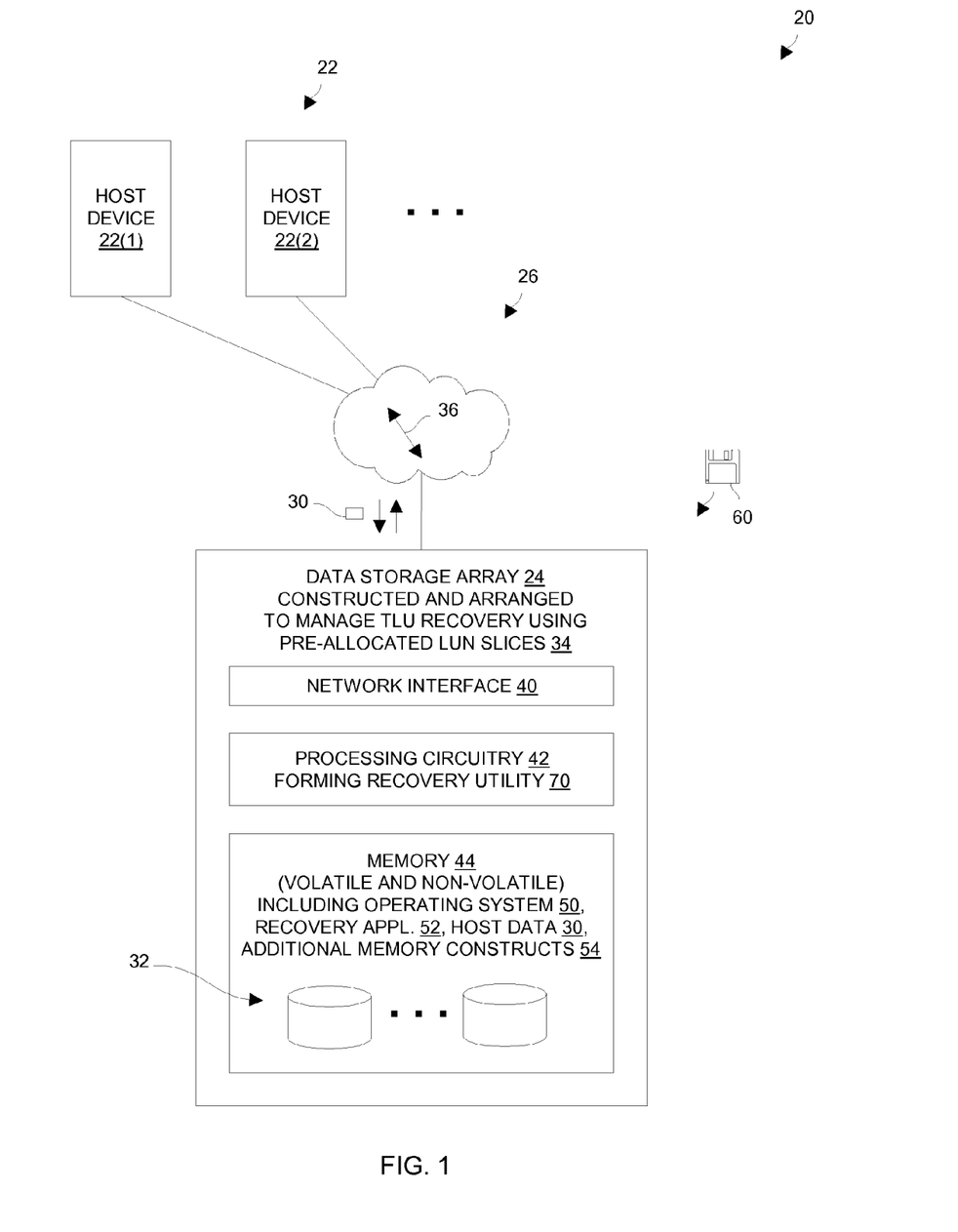
FIG. 1 is a block diagram of a data storage environment having a data storage array which performs TLU recovery using pre-allocated LUN slices.

FIG. 1 is a block diagram of a data storage environment 20 which is equipped for TLU recovery using pre-allocated LUN slices. The data storage environment 20 includes host devices 22(1), 22(2), . . . (collectively, host devices 22), a data storage array 24, and communications medium 26.

The host devices 22 are constructed and arranged to store host data 30 into and load host data 30 from the data storage array 24. Along these lines, each host device 22 is capable of providing IO instructions to the data storage assembly 24 (e.g., read IOs and write IOs in the form of SCSI commands, iSCSI commands, etc.).

The data storage array 24 is constructed and arranged to maintain the host data 30 in non-volatile storage 32 (e.g., solid state drives, magnetic disk drivers, combinations thereof, etc.) by processing the IO instructions from the host devices 22. In particular, the data storage array 24 manages the host data 30 within the non-volatile storage 32 via thin LUN provisioning in which LUN slices are added to TLUs on demand, i.e., as new host data 30 is added to the TLUs.

Additionally, as part of this process, the data storage array 24 is further constructed and arranged to perform TLU recovery in the event a TLU becomes unhealthy. For example, the data storage array 24 may discover that certain file system metadata has become corrupted. As will be explained in further detail shortly, the data storage array 24 performs TLU recovery using a set of pre-allocated LUN slices 34.

The communications medium 26 connects the various components of the data storage environment 20 together to enable these components to exchange electronic signals 36 (e.g., see the double arrow 36). At least a portion of the communications medium 26 is illustrated as a cloud to indicate that the communications medium 26 is capable of having a variety of different topologies including backbone, hub-and-spoke, loop, irregular, combinations thereof, and so on. Along these lines, the communications medium 26 may include copper-based data communications devices and cabling, fiber optic devices and cabling, wireless devices, combinations thereof, etc. Furthermore, the communications medium 26 is capable of supporting LAN-based communications, SAN-based communications, other protocols, combinations thereof, etc.

As shown in FIG. 1, the data storage array 24 includes a network interface 40, processing circuitry 42, and memory 44. The data storage array 24 may include other components as well, e.g., a user interface or a console port, a service processor, etc.

The network interface 40 is constructed and arranged to connect the data storage array 24 to the communications medium 26. In some arrangements, the network interface 40 is formed by one or more network adaptors or cards. Accordingly, the network interface 40 enables the data storage array 24 to communicate with the other components of the data storage environment 20 such as the host devices 22.

The processing circuitry 42 is constructed and arranged to perform load and store operations (i.e., to process host IOs) on behalf of the host devices 22 as well as various support functions (e.g., backups, security, etc.). In some arrangements, the processing circuitry 42 is formed by one or more storage processors, or directors.

The memory 44 is intended to represent both volatile memory (e.g., DRAM, SRAM, etc.) and non-volatile memory (e.g., flash storage units, magnetic disk drives, etc.). The memory 44 provides primary memory for running software, host data caches, and the non-volatile storage 32 which holds the host data 30. The memory 44 further stores an operating system 50 (e.g., a kernel, drivers, etc.), a recovery application 52, and additional memory constructs (e.g., metadata, user-level applications, and so on).

In some arrangements, the non-volatile storage 32 is tiered based on access speed. For example, the storage 32 may be formed by a first tier of flash memory, a second tier of SAS drives, and a third tier of near line SAS drives.

It should be understood that the processing circuitry 42 can be implemented in a variety of ways including via one or more processors running specialized software, application specific ICs (ASICs), field programmable gate arrays (FPGAs) and associated programs, discrete components, analog circuits, other hardware circuitry, combinations thereof, and so on. In the context of one or more processors running specialized software, a computer program product 60 is capable of delivering all or portions of the software to the data storage array 24. The computer program product 60 has a non-transitory (or non-volatile) computer readable medium which stores a set of instructions which controls one or more operations of the data storage array 24. Examples of suitable computer readable storage media include tangible articles of manufacture and apparatus which store instructions in a non-volatile manner such as CD-ROM, flash memory, disk memory, tape memory, and the like.

During operation, the data storage array 24 performs data storage operations on behalf of the host devices 22. While such operation takes place, the data storage array 24 is capable of detecting an unhealthy TLU and performing TLU recovery on unhealthy TLUs.

To perform TLU recovery, the processing circuitry 42 runs the recovery application 52 which consumes a small amount of work space. Execution of the recovery application 52 on the processing circuitry 42 forms a recovery utility (or tool) 70. Activation (or launching) of the recovery application 52 can be automatic, e.g., in response to detection by an error checking module of the data storage array 24. Alternatively, the recovery application 52 can be manually invoked, e.g., started by a user responsible for managing the data storage array 24 after receiving a warning message from the data storage array 24. Further details will now be provided with reference to FIGS. 2 through 4.

Figure 2:
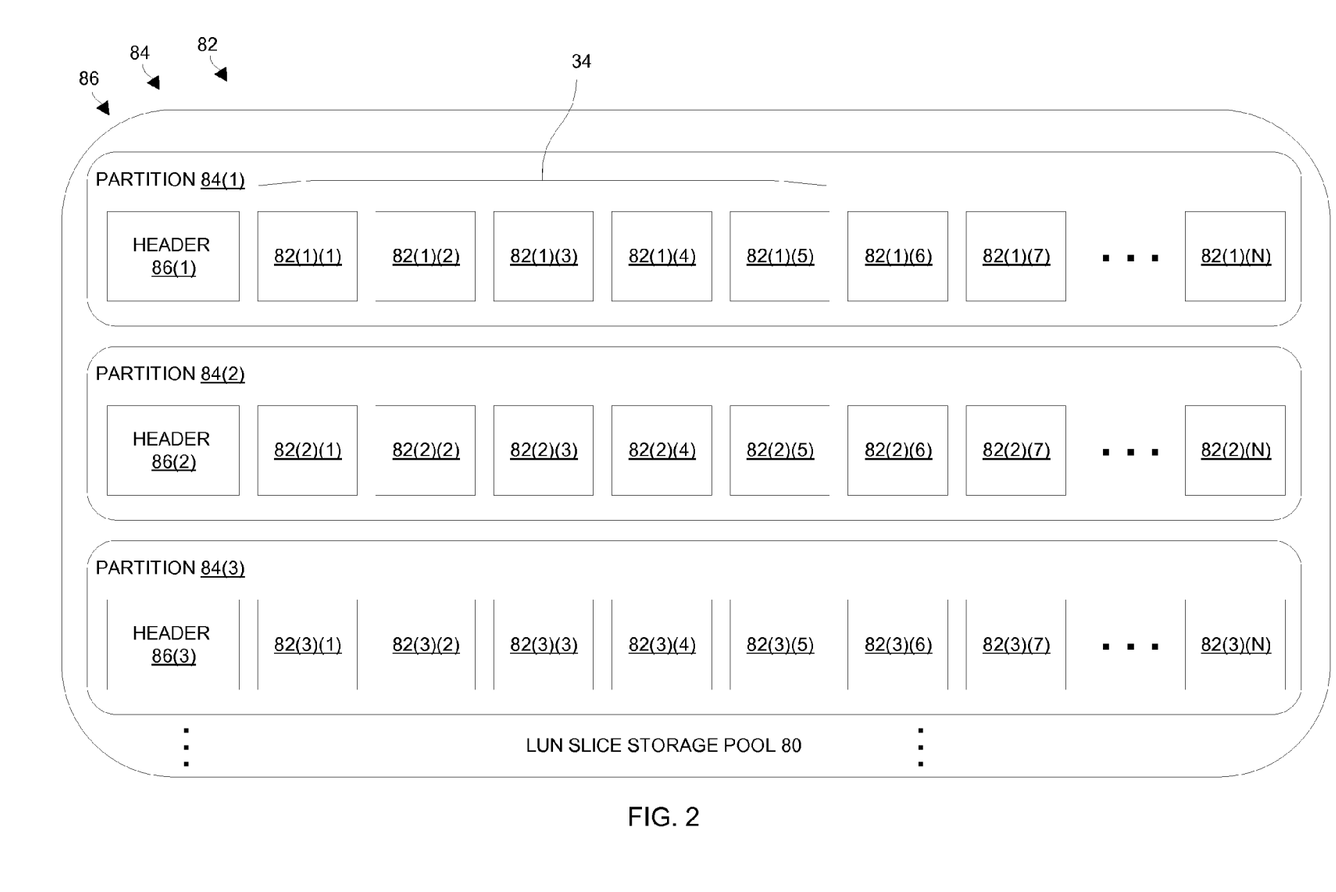
FIG. 2 is a block diagram of a slice storage pool at a first time of data storage array operation.
Figure 3:
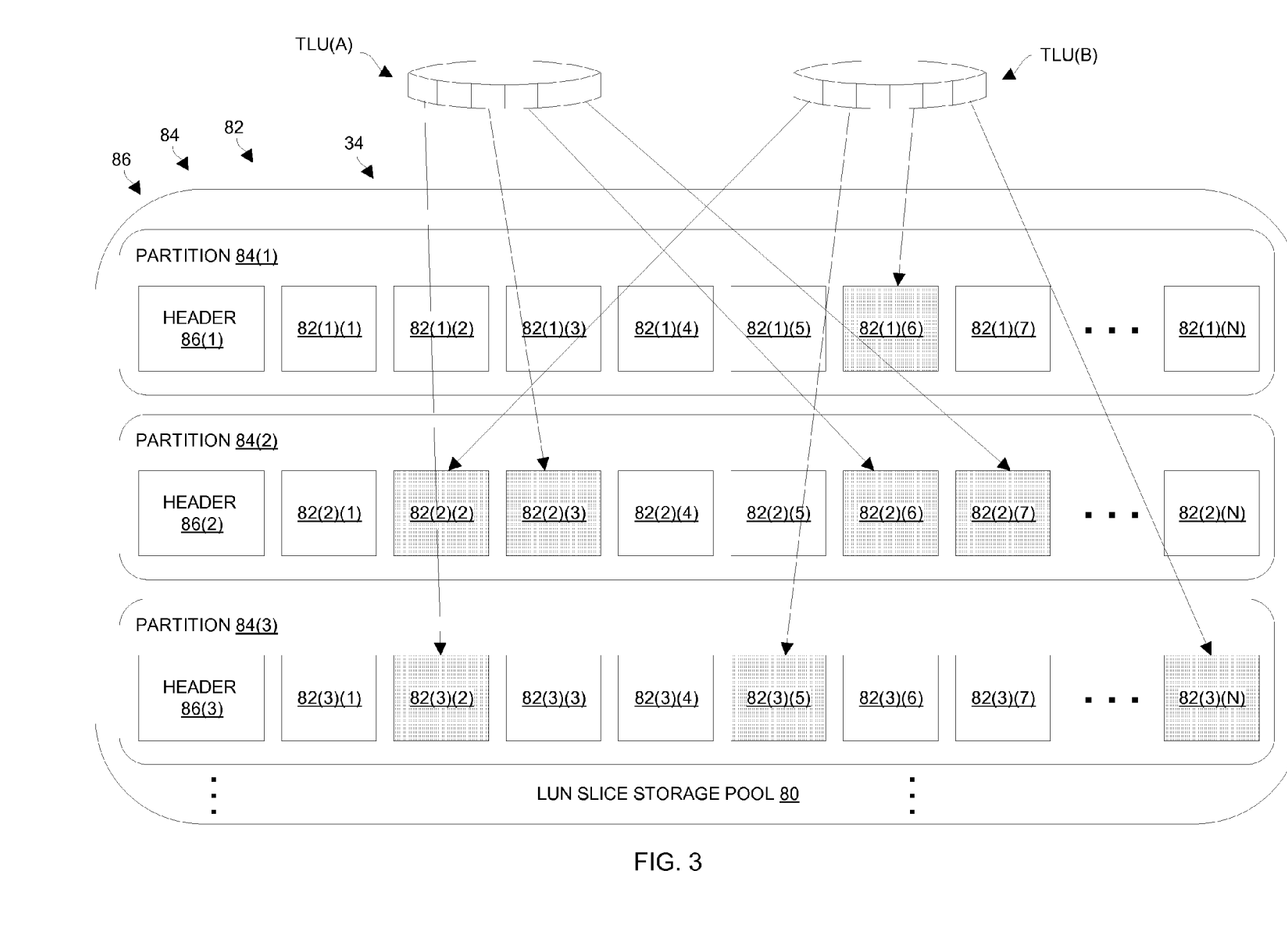
FIG. 3 is a block diagram of the slice storage pool at a second time of data storage array operation.
Figure 4:
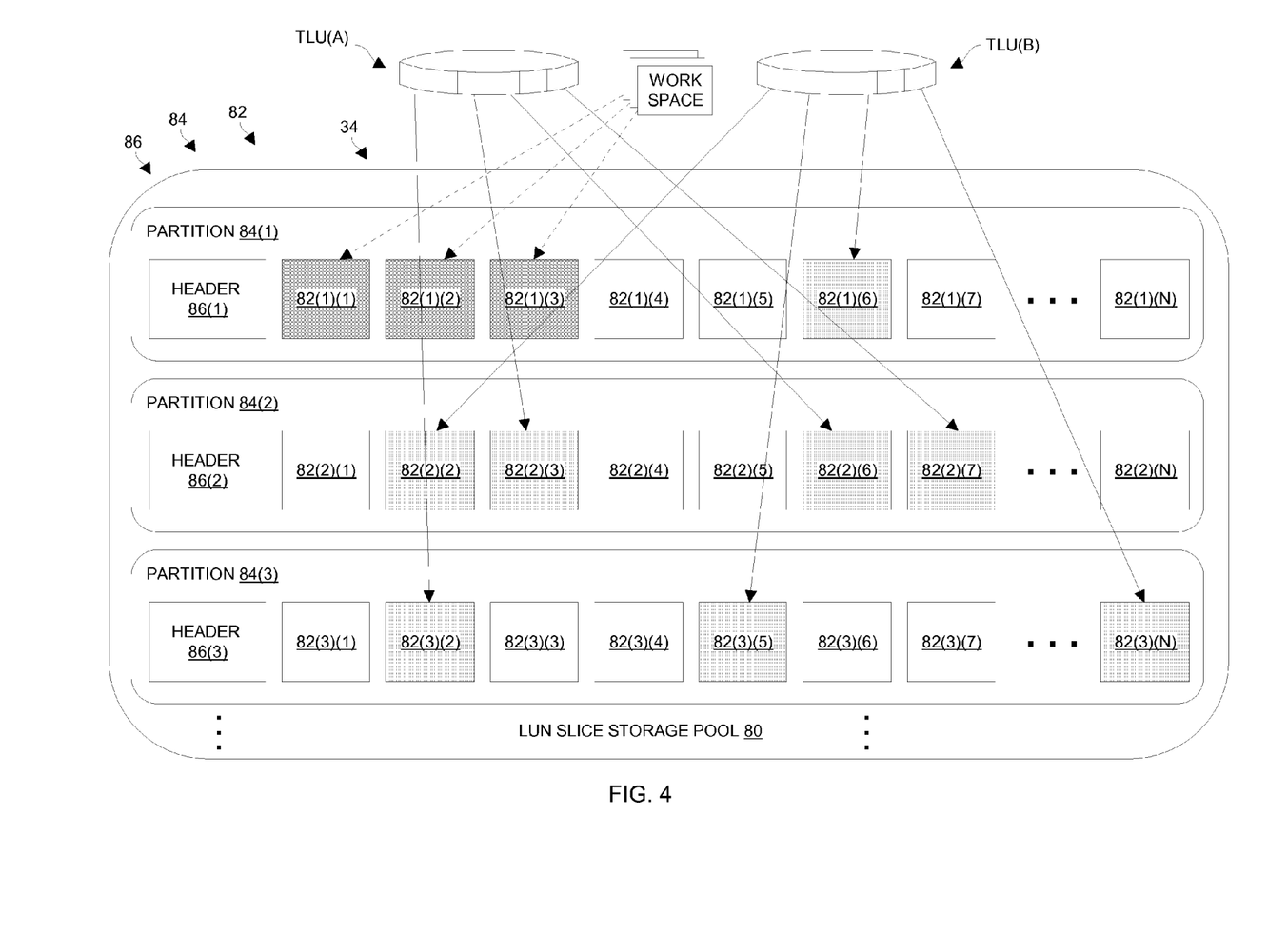
FIG. 4 is a block diagram of the slice storage pool at a third time of data storage array operation.

FIGS. 2 through 4 show a LUN slice storage pool 80 at various times of data storage array operation (also see FIG. 1). FIG. 2 shows the LUN slice storage pool 80 at an initial time before any TLUs consume LUN slices 82. FIG. 3 shows the LUN slice storage pool 80 at a second time (after the initial time) when the data storage array 24 maintains TLUs which consume LUN slices 82. FIG. 4 shows the LUN slice storage pool 80 at a third time when the data storage array 24 performs TLU recovery using pre-allocated LUN slices 80 to recover an unhealthy TLU.

As best seen in FIG. 2, the LUN slice storage pool 80 includes multiple storage partitions 84(1), 84(2), 84(3), . . . (collectively, partitions 84) which are large contiguous portions of memory formed by the non-volatile storage 32 (also see the memory 44 in FIG. 1). Such partitioning may be used by the operating system 50 to manage particular aspects of the data storage array 24 (e.g., for data management, for RAID groups, etc.). An example of a system which works in a manner similar to that described above is the Flare® system which uses Flare LUNs (FLUs), and which is provided by EMC Corporation of Hopkinton, Mass.

As further shown in FIG. 2, each storage partition 84 includes a partition header 86, and a series of LUN slices 82. For example, the storage partition 84(1) includes partition header 86(1), and a series of LUN slices 82(1)(1), 82(1)(2), . . . 82(1)(N), where N is a positive integer. Similarly, the storage partition 84(2) includes another partition header 86(2), and another series of LUN slices 82(2)(1), 82(2)(2), . . . 82(2)(N), and so on. The LUN slices 82 of each partition 84 are of a predefined size (e.g., 1 GB, 512 MB, 256 MB, etc.), and can be referenced via the header 86 of that partition 84.

Initially, all of the LUN slices 82 are free (or available). That is, the LUN slices 82 contain no host data 30 (FIG. 1) and are unallocated. At this time, the processing circuitry 42 allocates a set 34 of the LUN slices 82 to the recovery utility 70 (see FIGS. 1 and 2). This allocation of LUN slices 82 to the recovery utility 70 may occur automatically (e.g., in response to an initial configuration procedure performed at data storage array setup time), or manually by a user (e.g., in response to manual configuration commands supplied by the user). Once the set 34 of LUN slices 82 has been pre-allocation to the recovery utility 70, the set 34 of the LUN slices 82 are no longer available for allocation to a TLU for persistent storage of host data 30.

It should be understood that, by way of example only, five LUN slices 82(1)(1), 82(1)(2), 82(1)(3), 82(1)(4), 82(1)(5) of partition 84(1) form the set 34. It is possible for the set 34 to include a different number of LUN slices 82 (e.g., six, seven, and so on). It is also possible for the set 34 to include LUN slices 82 which are isolated from each other rather than contiguous. It is even possible for the LUN slices 82 of the set 34 to be distributed across multiple partitions 84.

After the set 34 of LUN slices 82 has been pre-allocated to the recovery utility 70 and as illustrated in FIG. 3, the data storage array 24 operates to manage host data 30 on behalf of host devices 22 (also see FIG. 1). Along these lines, the processing circuitry 42 allocates available (or free) LUN slices 82 from the LUN slice storage pool 80 to TLUs and stores host data 30 in the allocated LUN slices 82. Such consumption of available LUN slices 82 may occur incrementally (e.g., as the host devices 22 write new host data 30 to the data storage array 24 over time thus growing the TLUs in an on demand manner), or via migration (e.g., as host data 30 is copied from one data storage array 24 to another), combinations thereof, etc.

By way of example and as shown in FIG. 3, the data storage array 24 stores two TLUs to support storage of two file systems, i.e., TLU(A) and TLU(B). In particular, TLU(A) includes LUN slices 82(3)(2), 82(2)(3), 82(2)(6), and 82(2)(7) storing host data 30 for a first file system. Additionally, TLU(B) includes LUN slices 82(2)(2), 82(3)(5), 82(1)(6), and 82(3)(N) storing host data 30 for a second file system. As shown, the LUN slices 82 for a particular TLU may reside across multiple partitions 84.

It should be understood that modifications to the host data 30 stored within the LUN slices 82 of the TLUs results in overwriting of earlier-stored host data 30 with new host data 30 by the processing circuitry 42. Furthermore, addition of new host data 30 to a particular TLU results in adding, by the processing circuitry 42, one or more LUN slices 82 to that TLU to store the new host data 30.

Various mechanisms are suitable for controlling allocation of the LUN slices 82. In some arrangements, the processing circuitry 42 manages allocation of LUN slices 82 via a table or similar data structure (e.g., see the additional memory constructs 54 in FIG. 1). In other arrangements, the recovery application 52 maintains locks on the LUN slices 82 of the set 34 and does not relinquish the locks maintain exclusive use of the pre-allocated LUN slices 82.

Now, suppose that the processing circuitry 42 discovers that a particular TLU has corrupted data (e.g., corrupted metadata, etc.) and that the recovery application 52 is invoked. For example, TLU(A) may have corrupted metadata, but TLU(B) may be healthy.

In this situation, the recovery utility 70 utilizes the set 34 of pre-allocated LUN slices 82. In particular, the recovery utility 70 takes the unhealthy TLU offline (i.e., prevents the host devices 22 from accessing the unhealthy TLU), and consumes a specific number of pre-allocated LUN slices 82 from the set 34, i.e., the consumed LUN slices 82 transition to an in-use or locked state. The recovery utility 70 then performs error checking and correction operations to recover the corrupted data. For example, as shown in FIG. 4, one pre-allocated LUN slice 82(1)(1) may be consumed by the recovery utility 70, and two other pre-allocated LUN slices 82(1)(2) and 82(1)(3) may be used as work space for TLU recovery (e.g., temporary scratch space for data correction/reconstruction operations).

In the example of FIG. 4, some but not all of the pre-allocated LUN slices 82 are used for recovery of TLU(A). That is, pre-allocated LUN slices 82(1)(4) and 82(1)(5) of the set 34 remain available for use by the recovery utility 70. As mentioned earlier, the pre-allocated LUN slices 82(1)(4) and 82(1)(5) are not available for allocation on demand to a TLU to store new host data 30. Accordingly, such operation guarantees that the recovery utility 70 has LUN slices 82 in order to properly run and perform recovery of the corrupted TLU (e.g., TLU(A)).

Once TLU recovery is complete, the pre-allocated LUN slices 82(1)(1), 82(1)(2), 82(1)(3) that were used by the recovery utility 70 are released, i.e., are transitioned back to a free or unused state. However, these LUN slices 82(1)(1), 82(1)(2), 82(1)(3) remain pre-allocated to the recovery utility 70 and thus cannot be allocated to any TLUs for storage of new host data 30. Furthermore, the recovered TLU is moved back online so that a host device 22 can again read host data 30 from and write host data 30 to the TLU. Accordingly, the state of the LUN slice storage pool 80 after TLU recovery resembles what is shown in FIG. 3 except that the size of the other existing TLUs may have changed (e.g., TLU(B)), one or more TLUs may have been added, and so on.

As another example, suppose that the processing circuitry 42 discovers that multiple TLUs have corrupted data. In this situation, the recovery utility 70 again utilizes the set 34 of pre-allocated LUN slices 82. In particular, the recovery application 52 takes both unhealthy TLUs offline, and performs error checking and correction operations to recover the corrupted data. Here and as shown in FIG. 5, one pre-allocated LUN slice 82(1)(1) may be consumed by the recovery utility 70, two other pre-allocated LUN slices 82(1)(2) and 82(1)(3) may be used as work space to recover a first TLU (e.g., TLU(A)) and two other pre-allocated LUN slices 82(1)(4) and 82(1)(5) may be used as work space to recover a second TLU (e.g., TLU(B)).

Again, once TLU recovery is complete, the particular pre-allocated LUN slices 82 that were used by the recovery utility 70 are released, i.e., are transitioned back to a free or unused state. Additionally, the recovered TLU is moved back online so that a host device 22 can again read host data 30 from and write host data 30 to the TLU. As a result, the state of the LUN slice storage pool 80, after all TLUs are recovered, resembles what is shown in FIG. 3.

Figure 5:
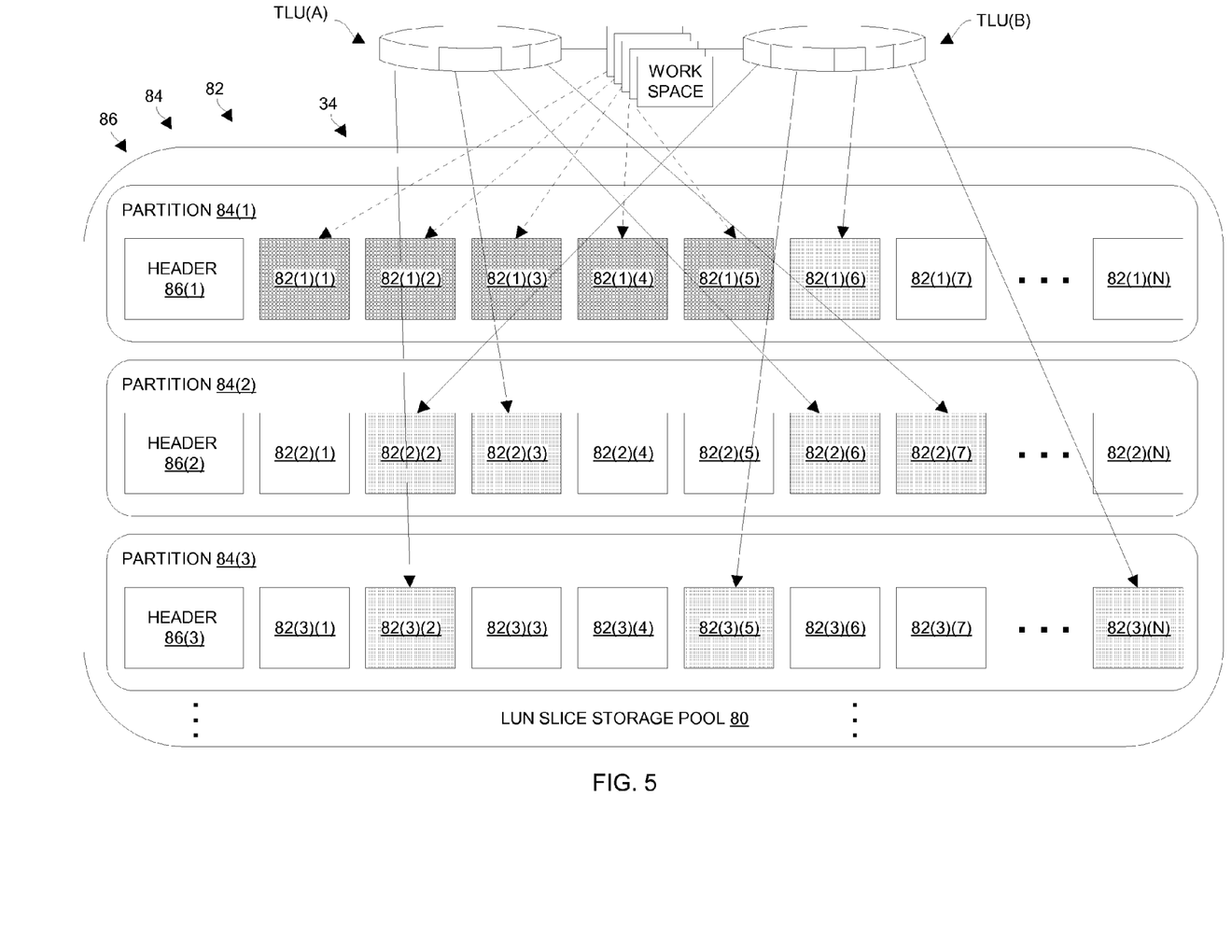
FIG. 5 is a block diagram of the slice storage pool during recovery of multiple TLUs.

Although FIG. 5 shows concurrent recovery of multiple TLUs, it should be understood that there is no requirement that TLU recovery of both TLUs start at the same time. Rather, the recovery utility 70 is capable of starting recovery of one TLU first (FIG. 4), and then starting recovery of another TLU (FIG. 5).

Likewise, there is no requirement that TLU recovery complete simultaneously. Rather, TLU recovery may complete for one TLU before TLU recovery completes for another TLU. In particular, as soon as TLU recovery completes for a particular TLU, the pre-allocated LUN slices 82 that were needed by the recovery utility 70 to recover that particular TLU are released for potential use in recovery of another TLU.

It should be understood that the more LUN slices 82 that are pre-allocated to TLU recovery, the more TLUs can be recovered simultaneously. For example, in the above described context, pre-allocating seven LUN slices 82 would support concurrent recovery of three TLUs, and so on. However, the cost of pre-allocating LUN slices 82 from the LUN slice storage pool 80 (e.g., two LUN slices 82 for each TLU to be concurrently recovered) is that the pre-allocated LUN slices 82 are not available for subsequent allocation to a TLU for storage of new host data 30. Further details will now be provided with reference to FIG. 6.

Figure 6:
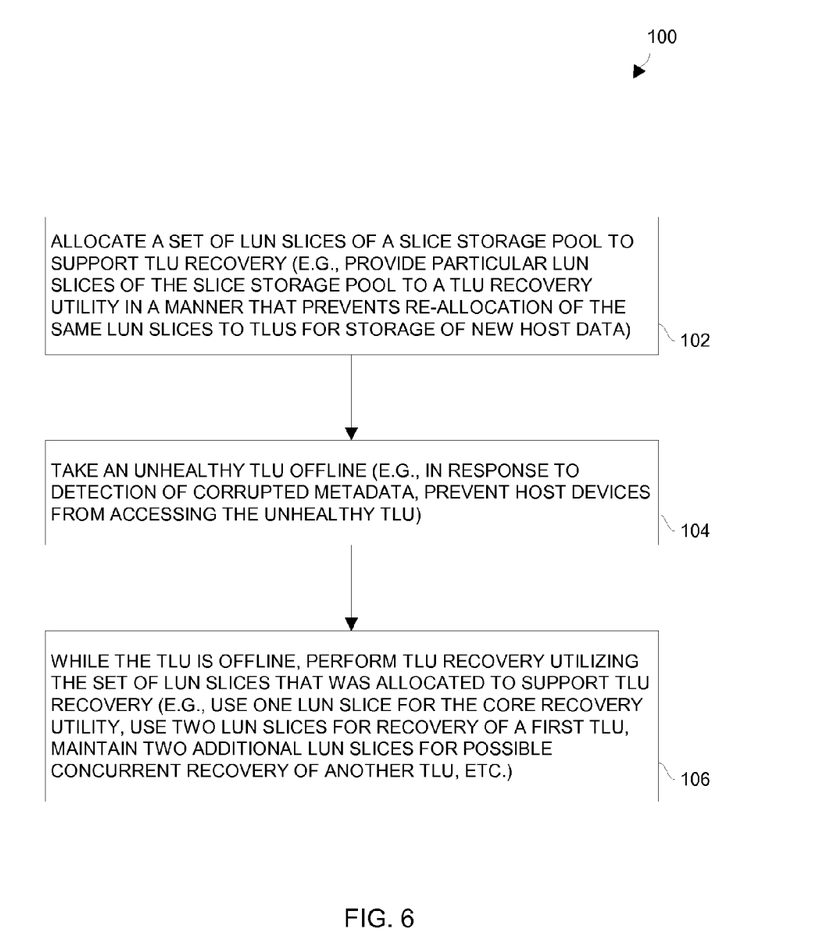
FIG. 6 is a flowchart of a procedure which is performed by the data storage array of FIG. 1.

FIG. 6 is a flowchart of a procedure 100 which is performed by the data storage array 24. In step 102, the data storage array 24 allocates a set 34 of LUN slices 82 of the slice storage pool 80 to support TLU recovery. The particular number of LUN slices 82 is predefined and based on the number concurrent TLU recovery sessions to be supported by the data storage array 24.

In step 104, the data storage array 24, after the set 34 of LUN slices 82 has been allocated, takes offline a TLU which currently requires TLU recovery. This activity may be initiated automatically via detection of an unhealthy TLU. Alternatively, a user may manually initiate this activity (e.g., in response to a report identifying the TLU as unhealthy).

In step 106, the data storage array 24 performs, while the TLU is offline, TLU recovery to recover the TLU. In particular, the recovery utility 70 formed by the processing circuitry 42 running the recovery application 52 (FIG. 1) performs a TLU recovery procedure to recovery corrupted data (e.g., incorrect bits of metadata, etc.). Such TLU recovery utilizes the set 34 of LUN slices 82 that was allocated to support TLU recovery.

As described above, improved techniques involve pre-allocating LUN slices 82 to support TLU recovery. With such pre-allocation, TLU recovery has an adequate amount of storage to use as work space when recovering TLU data. Additionally, with the LUN slices 82 pre-allocated to support TLU recovery, these LUN slices 82 may be shared (e.g., used to recover a first TLU containing host data 30 for a first file system, then used to recover a second TLU containing host data 30 for a second file system, and so on). Furthermore, in some arrangements, enough LUN slices 82 are pre-allocated to support recovery of multiple TLUs concurrently. With LUN slices 82 pre-allocated to TLU recovery, TLU recovery is guaranteed to have enough work space to properly recover data.

While various embodiments of the present disclosure have been particularly shown and described, it will be understood by those skilled in the art that various changes in form and details may be made therein without departing from the spirit and scope of the present disclosure as defined by the appended claims.

For example, it was described above that it is the recovery utility 70 that takes the unhealthy TLU offline. It should be understood that, in some arrangements, it is possible that the TLU was taken offline in the normal course of operation when the corrupted metadata was detected and not by the recovery utility 70 (e.g., by a user, by another utility or application, etc.). Such modifications and enhancements are intended to belong to various embodiments of this disclosure.

What is claimed is:

1. A data storage array which forms thin pool logical units (TLUs) from a slice storage pool of logical unit (LUN) slices, comprising:
   a host interface;
   storage which provides the slice pool of LUN slices; and
   processing circuitry coupled to the host interface and the storage, the processing circuitry being constructed and arranged to:
      allocate a set of LUN slices of the slice storage pool to support TLU recovery,
      after the set of LUN slices has been allocated, take offline a TLU which currently requires TLU recovery to prevent host access of the TLU through the host interface, and
      while the TLU is offline, perform a TLU recovery procedure to recover the TLU, the TLU recovery procedure utilizing the set of LUN slices that was allocated to support TLU recovery.

2. A data storage array as in claim 1 wherein the processing circuitry, when allocating the set of LUN slices of the slice storage pool to support TLU recovery, is constructed and arranged to:
   dedicate the set of LUN slices exclusively to TLU recovery to prevent allocation of any of the set of LUN slices to form TLU storage.

3. A data storage array as in claim 2 wherein the processing circuitry, when performing the TLU recovery procedure to recover the TLU, is constructed and arranged to:
   transition particular LUN slices of the set of LUN slices from a free state to an in-use state,
   access the particular LUN slices to recover data of the TLU, and
   transition the particular LUN slices from the in-use state back to the free state to release the particular LUN slices at completion of the TLU recovery procedure.

4. A data storage array as in claim 3 wherein the processing circuitry is further constructed and arranged to:
   move the TLU online upon completion of the TLU recovery procedure; and
   after completion of the TLU recovery procedure, take offline another TLU which currently requires TLU recovery and, while the other TLU is offline, performing another TLU recovery procedure to recover the other TLU, the other TLU recovery procedure re-utilizing the particular LUN slices of the set of LUN slices that was allocated to support TLU recovery.

5. A data storage array as in claim 4 wherein the particular LUN slices are shared by multiple TLUs during TLU recovery of the multiple TLUs.

6. A data storage array as in claim 3 wherein the processing circuitry is further constructed and arranged to:
while performing the TLU recovery procedure to recover the TLU, take offline another TLU which currently requires TLU recovery and, while the other TLU is offline, perform another TLU recovery procedure to recover the other TLU, the other TLU recovery procedure utilizing other LUN slices of the set of LUN slices that was allocated to support TLU recovery, the other LUN slices being different than the particular LUN slices of the set of LUN slices.

7. A data storage array as in claim 6 wherein the set of LUN slices provides enough space to concurrently perform TLU recovery on at least two TLUs.

8. A data storage array as in claim 3 wherein the TLU consumes free slices of the slice storage pool by converting the free slices into file system slices for storing portions of a file system; and wherein the processing circuitry, when dedicating the set of LUN slices exclusively to TLU recovery, is constructed and arranged to:
block use of any of the set of LUN slices as a file system slice and allowing use of the set of LUN slices as scratch space for TLU recovery.

9. In a data storage array which forms thin pool logical units (TLUs) from a slice storage pool of logical unit (LUN) slices, a method of managing TLU recovery, comprising:
allocating a set of LUN slices of the slice storage pool to support TLU recovery;
after the set of LUN slices has been allocated, taking offline a TLU which currently requires TLU recovery; and
while the TLU is offline, performing a TLU recovery procedure to recover the TLU, the TLU recovery procedure utilizing the set of LUN slices that was allocated to support TLU recovery.

10. A method as in claim 9 wherein allocating the set of LUN slices of the slice storage pool to support TLU recovery includes:
dedicating the set of LUN slices exclusively to TLU recovery to prevent allocation of any of the set of LUN slices to form TLU storage.

11. A method as in claim 10 wherein performing the TLU recovery procedure to recover the TLU includes:
transitioning particular LUN slices of the set of LUN slices from a free state to an in-use state,
accessing the particular LUN slices to recover data of the TLU, and
transitioning the particular LUN slices from the in-use state back to the free state to release the particular LUN slices at completion of the TLU recovery procedure.

12. A method as in claim 11, further comprising:
moving the TLU online upon completion of the TLU recovery procedure; and
after completion of the TLU recovery procedure, taking offline another TLU which currently requires TLU recovery and, while the other TLU is offline, performing another TLU recovery procedure to recover the other TLU, the other TLU recovery procedure re-utilizing the particular LUN slices of the set of LUN slices that was allocated to support TLU recovery.

13. A method as in claim 11, further comprising:
while performing the TLU recovery procedure to recover the TLU, taking offline another TLU which currently requires TLU recovery and, while the other TLU is offline, performing another TLU recovery procedure to recover the other TLU, the other TLU recovery procedure utilizing other LUN slices of the set of LUN slices that was allocated to support TLU recovery, the other LUN slices being different than the particular LUN slices of the set of LUN slices.

14. A method as in claim 11 wherein the TLU consumes free slices of the slice storage pool by converting the free slices into file system slices for storing portions of a file system; and wherein dedicating the set of LUN slices exclusively to TLU recovery includes:
blocking use of any of the set of LUN slices as a file system slice and allowing use of the set of LUN slices as scratch space for TLU recovery.

15. For a data storage array which forms thin pool logical units (TLUs) from a slice storage pool of logical unit (LUN) slices, a computer program product having a non-transitory computer readable medium which stores a set of instructions to manage TLU recovery, the set of instructions, when carried out by computerized circuitry, causing the computerized circuitry to perform a method of:
allocating a set of LUN slices of the slice storage pool to support TLU recovery;
after the set of LUN slices has been allocated, taking offline a TLU which currently requires TLU recovery; and
while the TLU is offline, performing a TLU recovery procedure to recover the TLU, the TLU recovery procedure utilizing the set of LUN slices that was allocated to support TLU recovery.

16. A computer program product as in claim 15 wherein allocating the set of LUN slices of the slice storage pool to support TLU recovery includes:
dedicating the set of LUN slices exclusively to TLU recovery to prevent allocation of any of the set of LUN slices to form TLU storage.

17. A computer program product as in claim 16 wherein performing the TLU recovery procedure to recover the TLU includes:
transitioning particular LUN slices of the set of LUN slices from a free state to an in-use state,
accessing the particular LUN slices to recover data of the TLU, and
transitioning the particular LUN slices from the in-use state back to the free state to release the particular LUN slices at completion of the TLU recovery procedure.

18. A computer program product as in claim 17, further comprising:
moving the TLU online upon completion of the TLU recovery procedure; and
after completion of the TLU recovery procedure, taking offline another TLU which currently requires TLU recovery and, while the other TLU is offline, performing another TLU recovery procedure to recover the other TLU, the other TLU recovery procedure re-utilizing the particular LUN slices of the set of LUN slices that was allocated to support TLU recovery.

19. A computer program product as in claim 17, further comprising:
while performing the TLU recovery procedure to recover the TLU, taking offline another TLU which currently requires TLU recovery and, while the other TLU is offline, performing another TLU recovery procedure to recover the other TLU, the other TLU recovery procedure utilizing other LUN slices of the set of LUN slices that was allocated to support TLU recovery, the other LUN slices being different than the particular LUN slices of the set of LUN slices.

20. A computer program product as in claim 17 wherein the TLU consumes free slices of the slice storage pool by converting the free slices into file system slices for storing portions of a file system; and wherein dedicating the set of LUN slices exclusively to TLU recovery includes:
 blocking use of any of the set of LUN slices as a file system slice and allowing use of the set of LUN slices as scratch space for TLU recovery.

\* \* \* \* \*